US006276221B1

(12) United States Patent
Grushansky et al.

(10) Patent No.: US 6,276,221 B1
(45) Date of Patent: Aug. 21, 2001

(54) APPARATUS AND METHOD FOR DETECTING LABELS

(75) Inventors: Anatoly Grushansky, Overland Park; James R. Harte, Shawnee, both of KS (US)

(73) Assignee: Koch Supplies Inc., Kansas City, MO (US)

( * ) Notice: Subject to any disclaimer, the term of this patent is extended or adjusted under 35 U.S.C. 154(b) by 0 days.

(21) Appl. No.: 09/370,638

(22) Filed: Aug. 6, 1999

(51) Int. Cl.[7] .......... G01N 19/00

(52) U.S. Cl. .......... 73/865.9; 156/351; 156/361

(58) Field of Search .......... 73/865.9; 156/351, 156/361

(56) References Cited

U.S. PATENT DOCUMENTS

| | | | | |
|---|---|---|---|---|
| 3,436,294 | | 4/1969 | Marano . | |
| 3,985,605 | * | 10/1976 | Treiber et al. | 156/384 |
| 4,132,583 | | 1/1979 | Hodgson . | |
| 4,214,938 | | 7/1980 | Figg . | |
| 4,267,004 | * | 5/1981 | Anderson | 156/361 |
| 4,301,598 | | 11/1981 | Scardapane . | |
| 4,303,461 | | 12/1981 | La Mers . | |
| 5,300,160 | | 4/1994 | Wilson et al. . | |
| 5,421,946 | | 6/1995 | Flaig . | |
| 5,597,440 | | 1/1997 | Pecha . | |
| 5,650,730 | | 7/1997 | Herbst, Jr. . | |
| 5,815,890 | | 10/1998 | Leifeld . | |

FOREIGN PATENT DOCUMENTS

| | | |
|---|---|---|
| 33 42 614 | 6/1985 | (DE) . |
| 0 577 880 | 1/1994 | (EP) . |
| 2025906 | 1/1980 | (GB) . |

* cited by examiner

*Primary Examiner*—Daniel S. Larkin
*Assistant Examiner*—Nashmiya Fayyaz
(74) *Attorney, Agent, or Firm*—Sonnenschein, Nath and Rosenthal

(57) ABSTRACT

The inventive label sensing device includes a label detector within a housing. The label detector includes a bearing assembly serving as a piston, the bearing assembly having a roller bearing for riding over label material. The roller bearing moves the bearing assembly vertically as the roller bearing rides over the label material based on the height differential of the label and the label substrate. The bearing assembly is in contact with the first end of a lever arm at a pivot point located on the bearing assembly. As the bearing assembly moves up and down, the first end of the lever arm moves responsive to movement of the pivot, generating an amplified signal in the second end of the lever arm, proportional to movement of the roller bearing. Provided at a location adjacent to the second end of the lever arm is a proximity sensor for detecting the movement of the second end of the lever arm within a soft switching region.

16 Claims, 5 Drawing Sheets

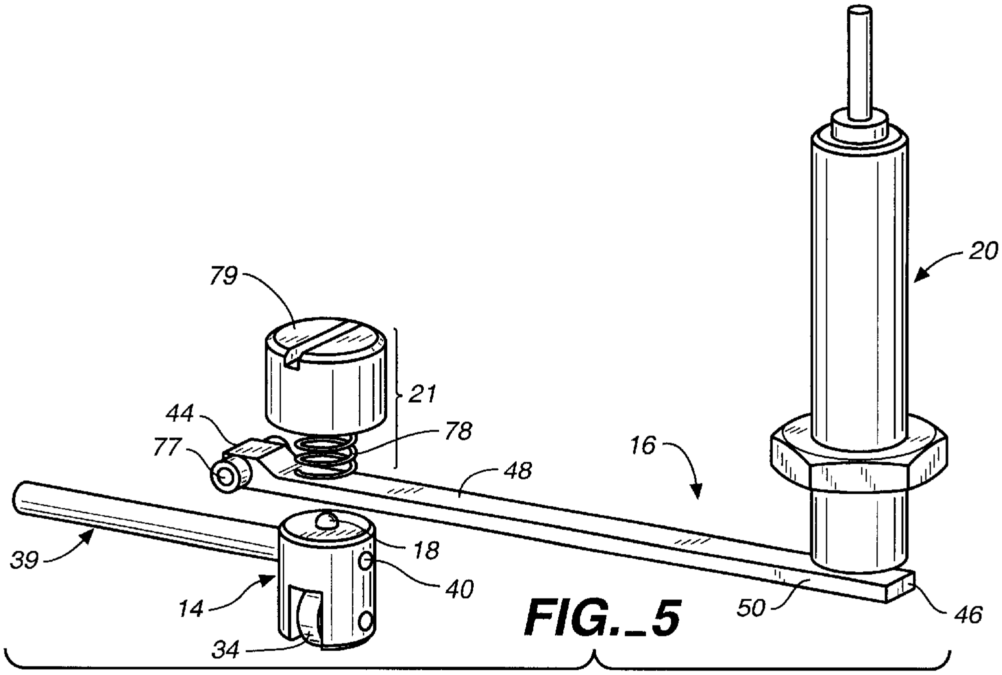
FIG._5
FIG._6
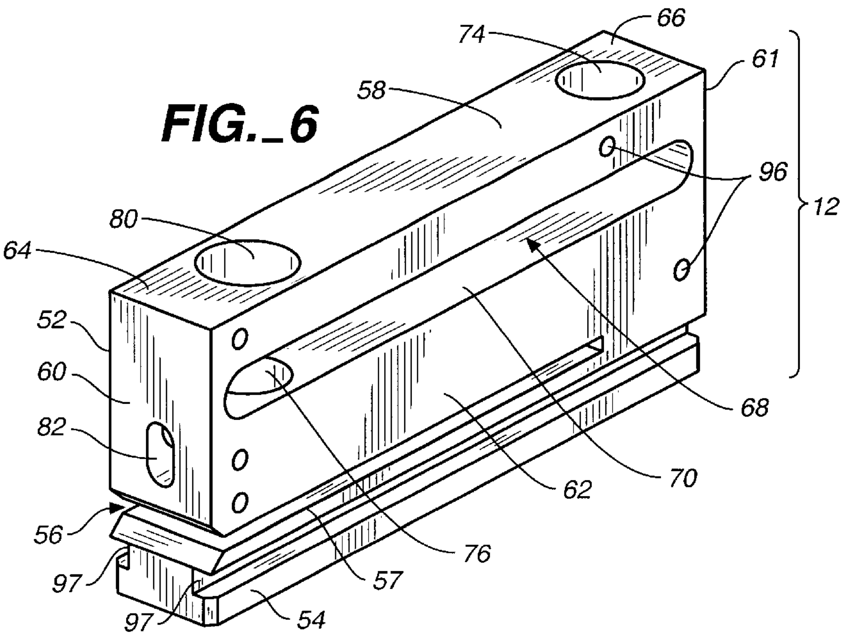
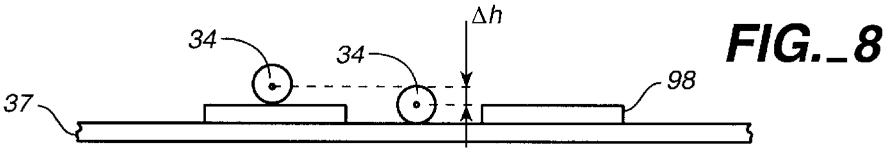
FIG._8

APPARATUS AND METHOD FOR DETECTING LABELS

BACKGROUND OF THE INVENTION

A. Field of the Invention

This invention relates to an apparatus and method for detecting labels and more particularly to an apparatus and method for detecting labels removably adhered in a strip-like fashion on a substrate, combining mechanical and proximity sensing. The movement of a mechanical sensor detects the leading edge of the label while a lever arm amplifies that movement for detection by a proximity sensor, thereby providing a label detecting method and apparatus functioning accurately regardless of wear on the mechanical system.

B. Prior Art

It is known in the art of labeling and labeling machines to provide a label detector. A label detector is required and usually incorporated into a labeling device to sense the leading edge of a label on the label's backing material for synchronizing the labeling machine to properly register the label for application to the product. Four types of label detectors are generally known in the art of labeling: optical thru-beam, optical reflective, capacitive, and mechanical.

First, it is known to use a labeling machine employing an optical thru-beam for label detection. The optical thru-beam label detecting device employs a light beam from a source positioned above the label and a receiver positioned below the label backing paper stock. The optical thru-beam detector senses the label by analyzing the differences in light intensities between the backing material opacity and the label with backing material opacity. The main disadvantage of an optical thru-beam label detector is its inability to detect clear or translucent labels because the difference in light intensity between the backing material opacity and the label with backing material opacity is negligible and difficult to analyze.

Second, it is also known to use a labeling machine employing an optical reflective technique to detect labels. The optical reflective technique for detecting labels uses a light source and a receiver positioned above the label at an incident angle. This type of device detects the label by sensing the difference in reflective properties between the backing paper and the label. An optical reflective detector employing this technique, however, requires extremely precise positioning and often produces "false triggers" on different printed regions of the label being detected.

A third method for detecting labels known in the art is described in Herbst, Jr. U.S. Pat. No. 5,650,730 (hereinafter "'730 Patent"). The '730 Patent discloses a label detector using a capacitive technique. The capacitive label detector described in the '730 Patent detects a label by calculating the difference in the dielectric measurement between the backing material without the label and the backing material with the label. It is apparent to those skilled in the art, however, that the capacitive label detector is deficient because it cannot detect labels containing conductive material, such as foil labels. Additionally, this type of label detector is not preferred because it cannot detect labels using conductive inks, particularly carbon based black ink, an ink very common on labels.

Finally, it is known to provide a mechanical label detector using a mechanical switch to sense the difference in thickness between the backing material without the label and the backing material with the label. The thickness differential can be as small as 0.004 inches and still be detected. Mechanical label detectors generally use a high precision mechanical switch mounted to a pin or bearing, which rides over the label material. The switch must be adjusted to open and close exactly where the small motion occurs. In other words, the mechanical label detector has a small finite switching margin. The drawback to the conventional mechanical label detector, however, is the mechanical label detector requires extremely precise adjustment due to the small finite switching margin reflected in the thickness differential. These kinds of adjustments often are difficult to perform. Another drawback to the conventional mechanical label detector is that the detector is frequently thrown out of adjustment from any wear in the system requiring frequent tinkering and replacement of parts.

SUMMARY OF THE INVENTION

The inventive mechanical label sensing apparatus comprises a label detector placed within a housing. The label detector comprises a bearing assembly serving as a piston, the bearing assembly having a roller bearing for riding over label and label backing material. The roller bearing moves the bearing assembly up and down as the roller bearing rides over the label material based on the height differential of the label and the label backing. The bearing assembly is in contact with the first end of a lever arm at a pivot point located on the bearing assembly. As the bearing assembly moves up and down, the first end of the lever arm moves over the pivot point generating an amplified physical movement of the roller bearing in the second end of the lever arm. Provided at a location adjacent to the second end of the lever arm is a proximity sensor for detecting the movement of the second end of the lever arm. The proximity sensor has a coil that generates a magnetic field. A switch in the proximity sensor is "tripped" when the second end of the lever arm enters the magentic field.

It is an object of the present invention to combine a proximity sensor with a mechanical label detector to provide a label detector with a "soft" switching field region.

It is another object of the present invention to provide a label detector that can withstand wear, yet maintain accuracy.

It is another object of the present invention to provide a label detector capable of detecting different kinds of labels including clear or translucent labels and labels containing conductive materials or conductive ink.

It is another object of the present invention to provide a label detector with a simple initial adjustment.

It is another object of the present invention to provide a label detector that produces a minimum of "false triggers".

It is another object of the present invention to provide a label detector that is not affected by the dielectric or optical properties of the labels being detected.

DESCRIPTION OF THE DRAWINGS

FIG. 5 is a schematic perspective drawing of the detection and signal amplification elements of the invention.

FIG. 6 is a front perspective view of the housing of the present invention.

FIG. 8 is an enlarged front view of the label strip of the present invention illustrating the height differential Δh between the position of the roller bearing when in contact with the label substrate with a label and the space adjacent without a label.

DESCRIPTION OF THE PREFERRED EMBODIMENTS

Figure 1:
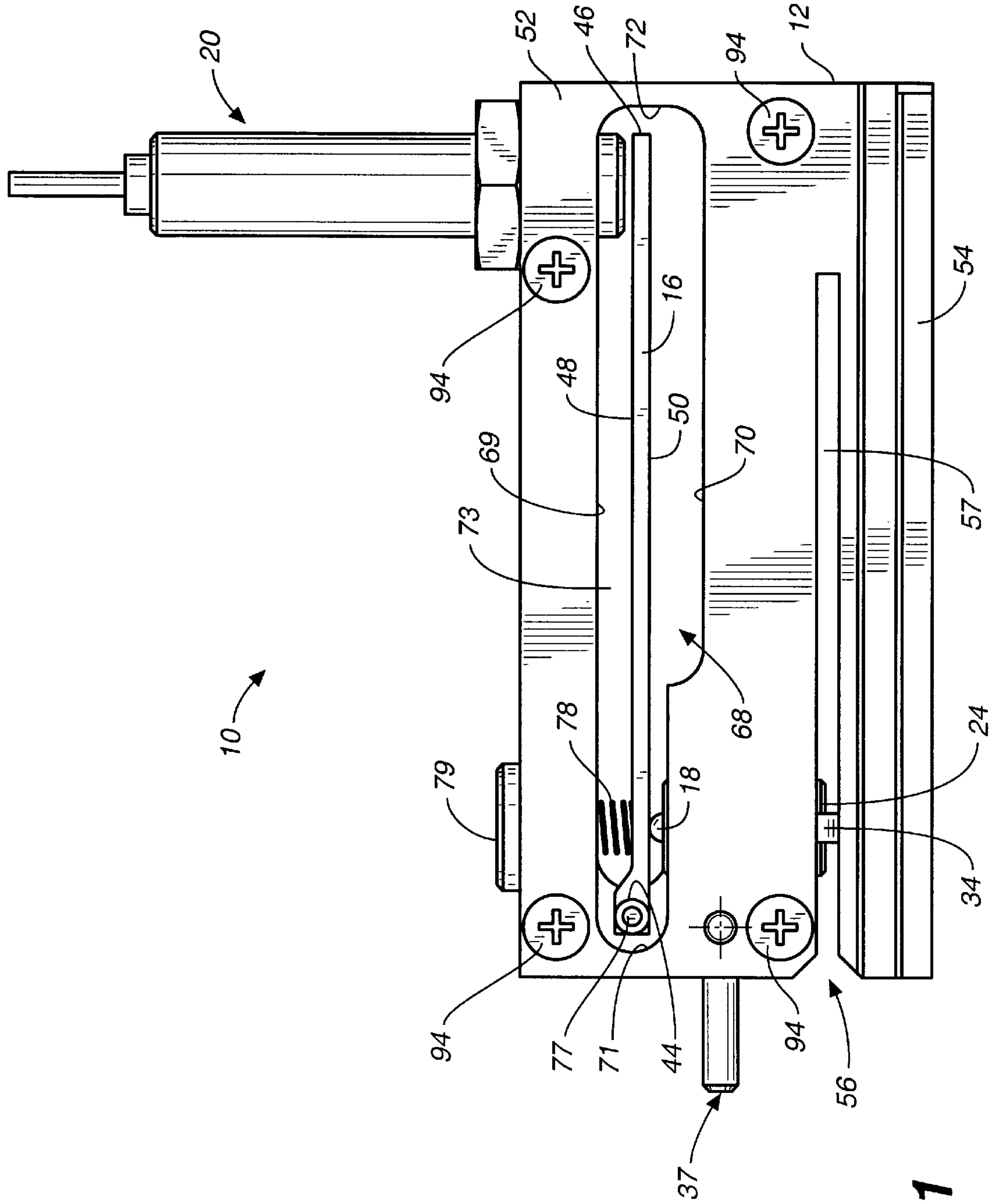
FIG. 1 is a front elevation view of the label detector.
Figure 4:
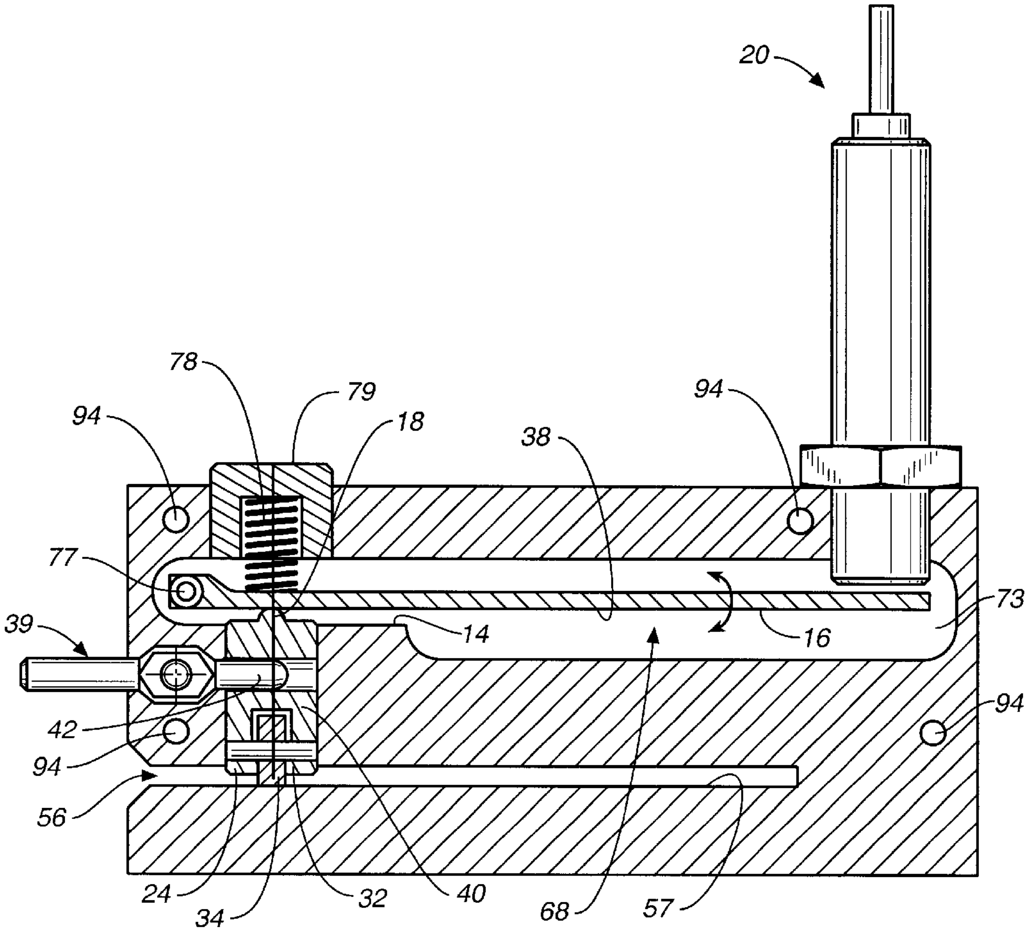
FIG. 4 is a cross-sectional view of the label detector of FIG. 3 taken along the line 3—3.

Referring to FIGS. 1, 4 and 5, the label detector 10 is disposed in a housing 12, and comprises a bearing assembly 14 (FIG. 4) acting as a piston, a lever arm 16 pivotably resting upon bearing assembly 14 (FIG. 4) on a pivot point 18, and a proximity sensor 20 located substantially adjacent one end of lever arm 16. A biasing means 21 (FIG. 5) biases lever arm 16 against pivot point 18.

Figure 7:
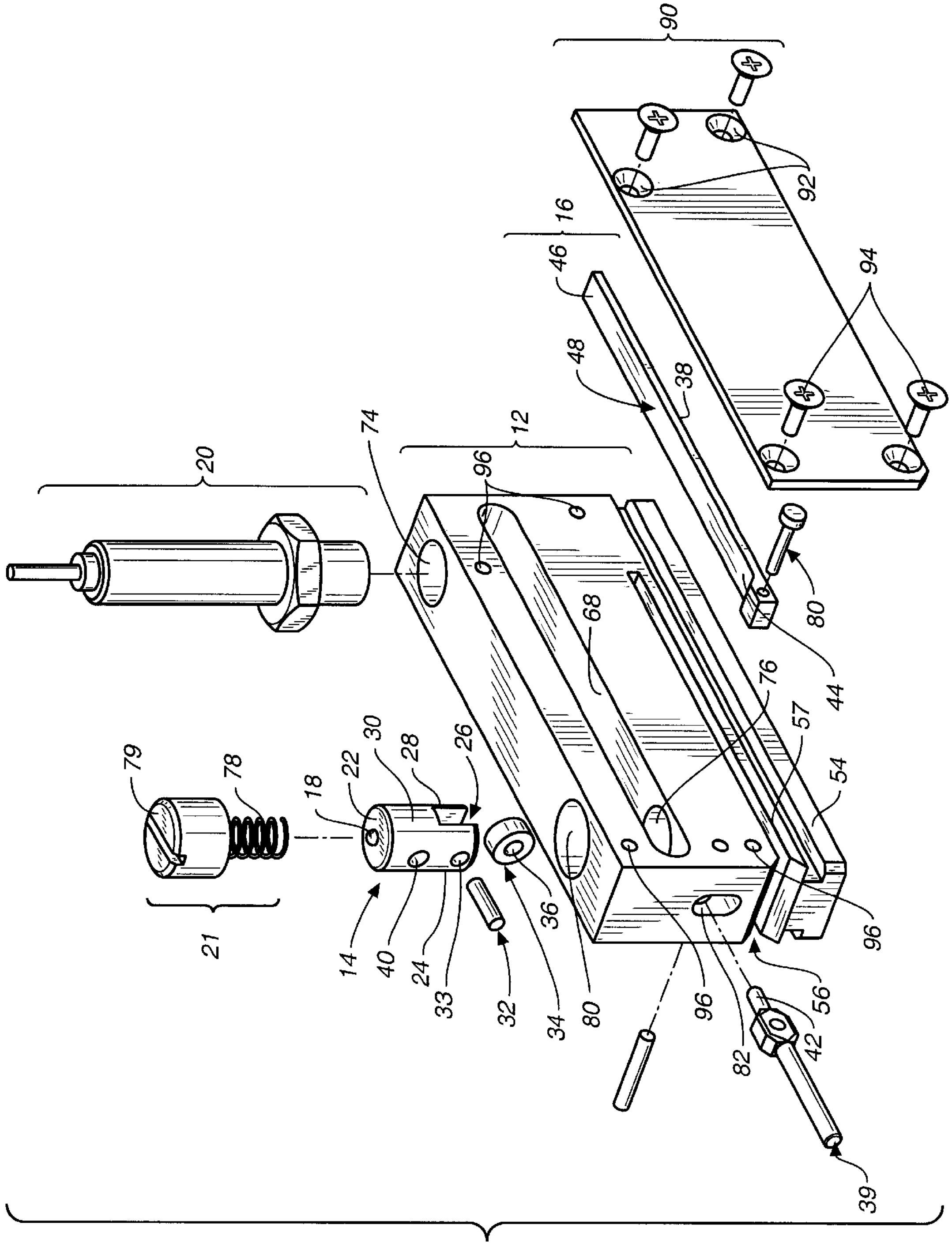
FIG. 7 is a front perspective exploded view of the label detector and housing.

As shown in FIG. 5, bearing assembly 14 of the preferred embodiment serves as a piston. Referring to FIG. 7 bearing assembly 14 is preferably cylindrical in shape having a closed flat top end 22 and an open bottom end 24 with a slot 26 dividing bearing assembly 14 into two sides 28, 30. A shaft 32 extends through apertures 33 in bearing assembly 14 and through sides 28,30 of slot 26. Shaft 32 is provided to mount a roller bearing 34 within bearing assembly 14. Shaft 32 is preferably made of stainless steel although any appropriate material providing the strength and low friction qualities of steel may be employed. Roller bearing 34 has a bore 36 therethrough for rotatably mounting roller bearing 34 upon shaft 32.

As shown in FIG. 4, shaft 32 is attached to bearing assembly 14 such that roller bearing 34 extends beyond the bottom end 24 of bearing assembly 14 allowing roller bearing 34 to come into contact with labeling substrate 37 (FIG. 8) and freely rotate over the substrate 37 (FIG. 8) without interference from bearing assembly 14. Roller bearing 34 is preferably made of stainless steel although any appropriate material may be employed. In the disclosed embodiment, a roller bearing 34 with an outside diameter less than 5.0 mm is preferred. While a roller bearing 34 is preferred, other contact elements, such as a pin bushing or a ball bearing, may be operatively connected to bottom end 24 of bearing assembly 14.

As shown in FIGS. 4 and 7, extending from approximately the middle of the top end 22 of bearing assembly 14 is a pivot point 18 in the form of a protuberance in the preferred embodiment. While it is preferred that pivot point 18 extend from the top end 22 of bearing assembly 14, it is contemplated that pivot point 18 could alternatively extend from the bottom surface 38 of lever arm 16 and come in contact with the top end 22 of bearing assembly 14.

Referring to FIG. 4, an optional lifting handle 39 may be provided to manually impart vertical movement to bearing assembly 14. Referring to FIG. 7, if lifting handle 39 is included, a bore 40 is provided near the top end 22 of bearing assembly 14 for receiving the first end 42 of lifting handle 39 and affixing lifting handle 39 to bearing assembly 14. It is understood that any appropriate means for affixing lifting handle 39 to bearing assembly 14 may be employed. Thus, the lifting handle 39 may be used to manually move bearing assembly 14 up and down allowing for easy insertion and processing of the labeling substrate 37. Lifting handle 39 is preferably made of stainless steel, although any appropriate material may be employed.

As shown in FIG. 1, a pivotal lever arm 16, having first and second ends 44, 46, bottom surface 38 and top surface 48 pivots in a vertical plane about pivot point 18. The bottom surface 38 of lever arm 16 near the first end 44 of lever arm 16 rests upon the pivot point 18. The lever arm 16 is preferably made of stainless steel, although any appropriate material having the qualities of ferric steel may be employed.

As shown in FIG. 1, label detector 10 includes a proximity sensor 20 located substantially near the second end 46 of lever arm 16. In the preferred embodiment, proximity sensor 20 is a proximity sensor located above the top surface 48 of second end 46 of lever arm 16. Specifically, it is preferred that the proximity sensor 20 is an inductive proximity sensor. It is understood, however, by those skilled in the art that proximity sensor 20 may be located in any area near the second end 46 of lever arm 16 provided proximity sensor 20 is substantially close to the second end 46 of lever arm 16 to detect the vertical movement of the second end 46 of the lever arm 16. In the preferred embodiment, proximity sensor 20 generates a magnetic field or a "soft" switching region of approximately 0.004 inches. Proximity sensor 20 detects lever arm 16 when the second end 46 of lever arm 16 either enters or exits the soft switching region.

Figure 2:
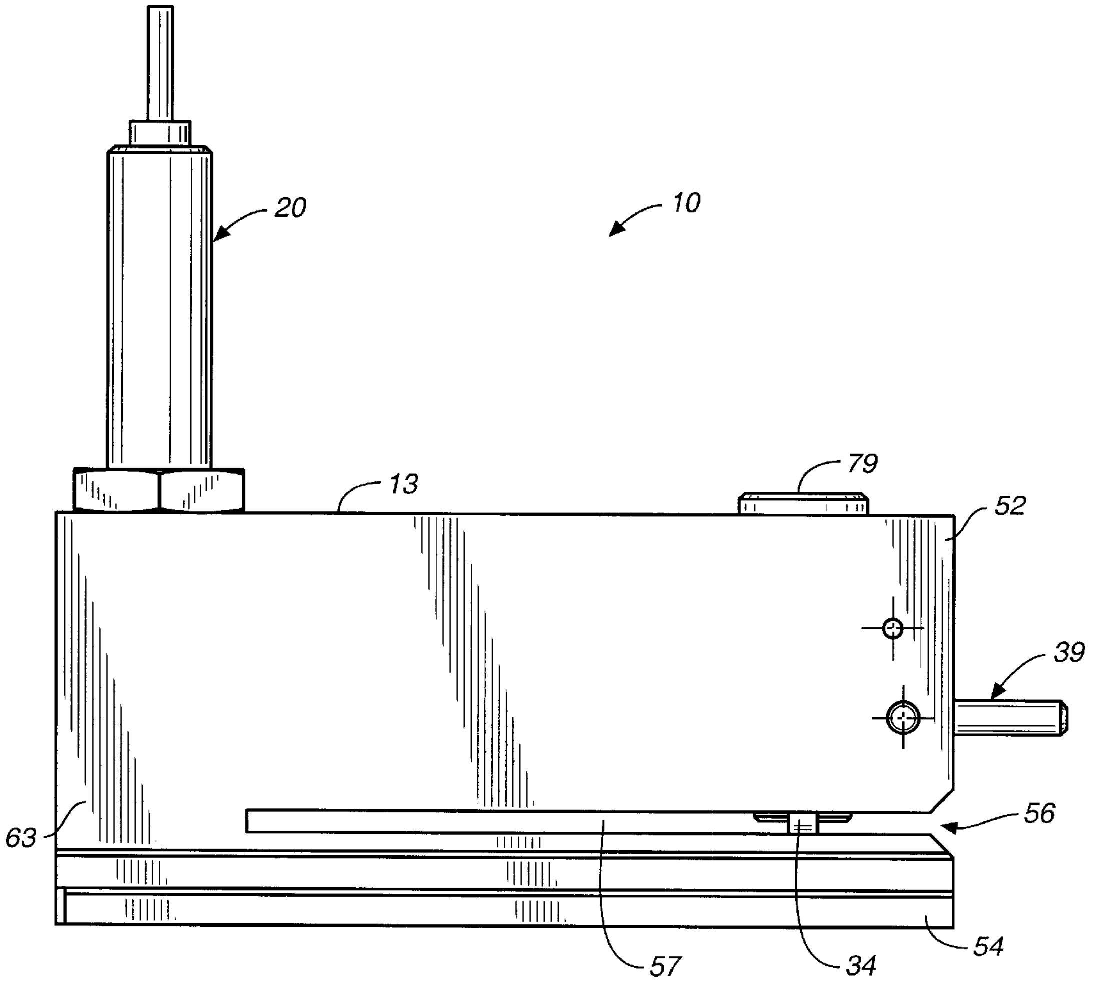
FIG. 2 is a rear elevation view of the label detector.
Figure 3:
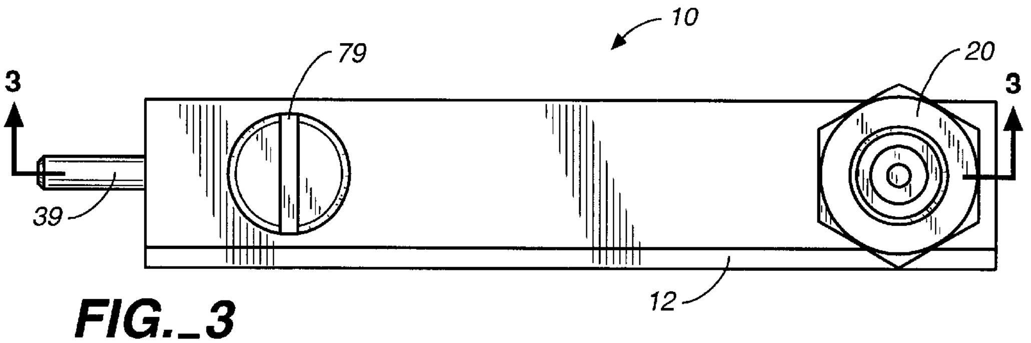
FIG. 3 is a top plan view of the label detector.

As shown in FIG. 1, it is preferred to have the label detector 10 mounted in housing 12. Referring to FIG. 6, the housing 12 is generally rectangular in shape, having an upper portion 52, lower portion 54 and a mouth 56 providing entry to a slot 57 located between the upper and lower portions 52, 54. As shown in FIG. 6, the upper portion 52 of housing 12 has a top surface 58, front surface 60, rear surface 61, a first side surface 62 and a second side surface 63 (FIG. 2), a first end 64 and a second end 66.

As shown on FIG. 6 located on the first side surface 62 of the upper portion 52 is a slotted portion or window 68 extending laterally only part of the way through housing 12. Window 68 is a slotted portion on the first side surface 62 that extends from the first end 64 of upper portion 52 of housing 12 to the second end 66 of upper portion 52 of housing 12. Referring to FIG. 1, inside the window 68 is an upper surface 69, a lower surface 70, a front surface 71, a rear surface 72 and a back surface 73. The back surface 73 of the window 68 is formed by the second side surface 63 (FIG. 2) of the upper portion 52 of the housing 12. Window 68 is of sufficient dimensions to accommodate housing and operation of the lever arm 16 within the window 68.

As shown in FIG. 6, on the top surface 58 of upper portion 52 of housing 12 is a first opening 74. In the preferred embodiment, the first opening 74 is a cylindrical threaded bore, although any opening will suffice. First opening 74 of housing 12 is located near the second end 66 of upper portion 52 of housing 12. First opening 74 extends from the top surface 58 of upper portion 52 of housing 12 through the upper surface 69 of window 68 into window 68. As shown in FIG. 7, first opening 74 is sized to mount proximity sensor 20 such that proximity sensor 20 is able to detect movement of lever arm 16 within window 68 of housing 12, as will be explained.

As shown in FIG. 6, a second opening 76 is located on lower surface 70 of window 68 near first end 64 of upper portion 52 of housing 12. Second opening 76 extends from lower surface 70 of window 68 into slot 57 of housing 12. Referring to FIG. 7, in the preferred embodiment, second opening 76 is a cylindrical bore sized to slidably accommodate bearing assembly 14 such that top end 22 of bearing assembly 14 reciprocates within window 68. Bearing assembly 14 reciprocates within second opening 76 while roller bearing 34 operatively connected to bottom end 24 of bearing assembly 14 reciprocates within slot 57 of housing 12.

As shown in FIG. 1, in the preferred embodiment, a pin 77 pivotably affixes first end 44 of lever arm 16 to back surface 73 of the window 68 near first end 64 (FIG. 6) of upper portion 52 of housing 12. Bottom surface 38 of lever arm 16 near, but at a slight distance from, first end 64 of upper portion 52 of housing 12 rests upon pivot point 18, causing lever arm 16 to pivot about pin 77 when upward or downward force is applied to lever arm 16 by bearing assembly 14 (FIG. 5) or by biasing means 21 (FIG. 5). Lever arm 16 is biased by biasing means 21 (FIG. 5) to maintain second end 46 of lever arm 16 in contact with lower surface 70 of window 68. Referring to FIG. 5, it is preferred to have a spring 78 secured by a spring cap 79 as biasing means 21.

Referring to FIG. 6, it is also preferred, although not necessary to the operation of the invention, to have a third opening 80 above and in alignment with second opening 76. Third opening 80 extends from top surface 58 of upper portion 52 of housing 12 into window 68 of housing 12. In the illustrated embodiment, third opening 80 is a cylindrical threaded bore that houses and maintains biasing means 21. Spring cap 79 screws into third opening 80 and spring 78 extends into window 68 and presses against top surface 48 of lever arm 16, biasing lever arm 16 against pivot point 18.

As discussed previously, in the preferred embodiment, an optional lifting handle 39 may be provided. As shown in FIGS. 5 and 6, to accommodate lifting handle 39, a fourth opening 82 may be provided in housing 12. Fourth opening 82 is located on front surface 60 of upper portion 52 of housing 12 and extends into second opening 76 allowing lifting handle 39, connected to bearing assembly 14, to extend through fourth opening 82 and outwardly from housing 12. Fourth opening 82 is of sufficient dimension to allow operation of lifting handle 39.

As shown in FIG. 7, it is preferred, although not necessary, to provide a side plate 90 for covering window 68 and protecting the individual parts within window 68 of housing 12. On first side surface 62 of upper portion 52 of housing 12 are four threaded apertures 92 for receiving screws 94. Apertures 92 correspond to apertures 96 on housing 12 for receiving screws 94 for affixing side plate 90 to housing 12.

Referring to FIG. 6, optional slotted grooves 97 are provided in the illustrated embodiment. Slotted grooves 97 modularize the label detector 10 and allow for easy insertion and removal of the label detector 10 within a labeling machine.

In operation, the leading edge of a labeling substrate material 37 (FIG. 8), to which a plurality of labels 98 are removably adhered in spaced relation, is passed through mouth 56 of housing 12 into slot 57. The user lifts bearing assembly 14 with lifting handle 39 allowing the substrate 37 with labels 98 to pass underneath roller bearing 34. Bearing assembly 14 is then lowered onto the labeling substrate 37. The label substrate 37 with spaced labels 98 is continuously fed through slot 57 of housing 12. As the label strip passes under roller bearing 34, roller bearing 34 rotates over and in contact with the substrate 37 and labels 98, causing bearing assembly 14 to move up as the circumferential surface of roller bearing 34 passes from a portion of label material containing only label substrate 37 to a portion of label material containing both a label 98 and the label substrate 37. Similarly, biasing means 21 causes bearing assembly 14 to move down as roller bearing 34 passes back from a portion of label substrate 37 containing both the label 98 and the label substrate 37 to a portion of the label material containing only label substrate 37. Thus, roller bearing 34, and bearing assembly 14, in turn, move upwards in an amount equal to the height differential Ah between the label substrate 37 with a label 98 and the label substrate 37 without a label 98.

The up and down movement of bearing assembly 14 translates into an up and down movement of pivot point 18, which in turn causes an amplified up and down movement in second end 46 of lever arm 16. Thus, a small up and down movement of roller bearing 34 results in an amplified proportional movement of second end 46 of lever arm 16.

Proximity sensor 20 generates a magnetic field or a "soft" switching field region. Proximity sensor 20 detects advancement of lever arm 16 towards or away from proximity sensor 20 when second end 46 of lever arm 16 either enters or exits the soft switching field region.

Thus, proximity sensor 20 is able to "detect" the leading and trailing edges of each label 98. In operation with a labeling machine, proximity sensor 20 of label detector 10 then passes on a signal regarding the edges of the labels to the labeling machine, allowing the labeling machine to properly register the labels for application to a product. Because of the increased amplified movement of the lever arm 16 compared to the movement of the roller bearing 34 (approximately ten times greater than the switching resolution of the proximity sensor 20), when adjusting the location of the proximity sensor 20 there is 0.032 inches of margin rather than the 0.004 inches of margin required by most mechanical label detectors.

As a further result, the label detector 10 does not come out of sensing adjustment as the system wears due to the switching margin. Additionally, the label detector 10 is not affected by the dielectric or optical properties of the labels being detected.

The foregoing description of the embodiments of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and modifications as are suited to the particular use contemplated. It is intended that the scope of the invention not be limited by the specification, but be defined by the claims set forth below.

We claim:

1. An apparatus for detecting the presence of a label adhered to a substrate, comprising:

a housing;

a bearing assembly reciprocally mounted in said housing;

a contact element operatively connected to said bearing assembly, said contact element adapted to contact the substrate and the label;

a lever arm pivotably connected to said housing;

a pivot point mounted on one of said bearing assembly and said lever arm;

biasing means urging said lever arm toward said bearing assembly, said lever arm adapted to pivot about said pivot point; and a proximity sensor mounted substantially adjacent said lever arm for detecting movement of said lever arm upon said contact element contacting the label or the space adjacent the label.

2. An apparatus as recited in claim 1 wherein said contact element is selected from a group consisting of a roller bearing, a ball bearing and a pin bushing.

3. An apparatus as recited in claim 1 wherein said proximity sensor is an inductive proximity sensor.

4. An apparatus as recited in claim 1 wherein said biasing means is a spring.

5. An apparatus as recited in claim 1 wherein said lever arm is made of ferric steel.

6. An apparatus as recited in claim 1 wherein said housing further comprises a window having upper and lower surfaces, said lever arm disposed in said window.

7. An apparatus as recited in claim 6 wherein said lever arm has first and second ends, and said biasing means biases said lever arm to maintain the second end of said lever arm in contact with said pivot point.

8. An apparatus as recited in claim 6 wherein said window further comprises a first opening and a second opening, the first opening for mounting said sensor, and the second opening for reciprocally mounting said bearing assembly.

9. An apparatus as recited in claim 1 wherein said housing further comprises an upper portion and a lower portion, the upper and lower portions defining a slot for receiving the label adhered to the substrate.

10. An apparatus as recited in claim 1 further comprising:

a lifting handle connected to said bearing assembly for manually moving said bearing assembly in a vertical direction.

11. An apparatus for detecting the presence of a label adhered to a substrate, comprising:

a housing;

a bearing assembly reciprocally mounted in said housing;

a roller bearing operatively connected to said bearing assembly, said roller bearing adapted to contact the substrate and the label;

a lever arm pivotably connected to said housing, a pivot point mounted on one of said bearing assembly and said lever arm;

a spring biasing said lever arm, said spring urging said lever arm toward said bearing assembly, said lever arm adapted to pivot about said pivot point; and a proximity sensor mounted substantially adjacent said lever arm for detecting the movement of said lever arm upon said roller bearing contacting the label or the space adjacent the label.

12. An apparatus as recited in claim 11 wherein said housing further comprises a window having upper and lower surfaces, said lever arm disposed in said window.

13. An apparatus as recited in claim 12 wherein said lever arm has first and second ends, and said spring biases said lever arm to maintain the second end of said lever arm in contact with said pivot point.

14. An apparatus as recited in claim 12 wherein said window further comprises a first opening and a second opening, the first opening for mounting said sensor, and the second opening for reciprocally mounting said bearing assembly.

15. An apparatus as recited in claim 11 wherein said housing further comprises an upper portion and a lower portion, the upper and lower portions defining a slot for receiving the label adhered to the substrate.

16. An apparatus as recited in claim 11 further comprising:

a lifting handle connected to said bearing assembly for manually moving said bearing assembly in a vertical direction.

* * * * *